United States Patent [19]

Mukai et al.

[11] Patent Number: 4,802,269
[45] Date of Patent: Feb. 7, 1989

[54] METHOD FOR PRODUCING CONNECTING ROD OF RECIPROCATING MOTION SYSTEM

[75] Inventors: Masato Mukai, Saitama; Koichi Komatsu, Shizuoka, both of Japan

[73] Assignee: Honda Giken Kogyo Kabushiki Kaisha, Tokyo, Japan

[21] Appl. No.: 61,875

[22] Filed: Jun. 11, 1987

Related U.S. Application Data

[62] Division of Ser. No. 775,987, Sep. 13, 1985, Pat. No. 4,693,139.

[30] Foreign Application Priority Data

Sep. 14, 1984 [JP] Japan .................. 59-193229

[51] Int. Cl.[4] ............................................. B21D 53/10
[52] U.S. Cl. ......................... 29/149.5 C; 29/156.5 A; 29/413; 225/2
[58] Field of Search ............... 29/149.5 R, 149.5 C, 29/156.5 A, 413; 225/2, 96

[56] References Cited

U.S. PATENT DOCUMENTS

| | | | |
|---|---|---|---|
| 2,371,399 | 3/1945 | Mantle | 29/149.5 |
| 2,553,935 | 5/1951 | Parks et al. | 29/156.5 |
| 2,729,521 | 1/1956 | Maybach et al. | 308/237 |
| 2,875,513 | 3/1959 | Dulin | 29/401 |
| 3,149,404 | 9/1964 | Sims | 29/148.4 |
| 3,818,577 | 6/1974 | Bailey et al. | 29/413.29 |
| 3,994,054 | 11/1976 | Cuddon-Fletcher | 29/156.5 A |
| 4,037,888 | 7/1977 | Mirjanic | 308/74 |
| 4,073,550 | 2/1978 | Yahraus | 308/23 |
| 4,569,109 | 2/1986 | Fetouh | 29/156.5 A |
| 4,688,446 | 8/1987 | Ishikawa | 29/156.5 A |

FOREIGN PATENT DOCUMENTS

| | | | |
|---|---|---|---|
| 58-37311 | 3/1958 | Japan . | |
| 776840 | 6/1957 | United Kingdom | 29/149.5 |
| 989946 | 4/1965 | United Kingdom | 29/149.5 |

Primary Examiner—Timothy V. Eley
Assistant Examiner—Frances Chin
Attorney, Agent, or Firm—Lyon & Lyon

[57] ABSTRACT

In a connecting rod of reciprocating motion system in which a larger diameter end portion is divided into a body side bearing half and a bearing cap, and in which after a bearing metal is incorporated in a bearing hole defined by the bearing half and the bearing cap, the bearing half and bearing cap are integrally connected together by bolts, chamfers are made in the peripheral portions of the bearing half and the bearing cap facing their broken and divided surfaces. Such chamfers are made before the dividing of the larger diameter end portion and thus cause the breaking and dividing operation to be facilitated.

4 Claims, 3 Drawing Sheets

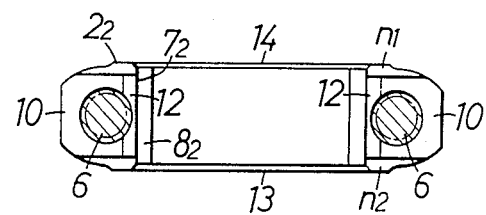
FIG.3
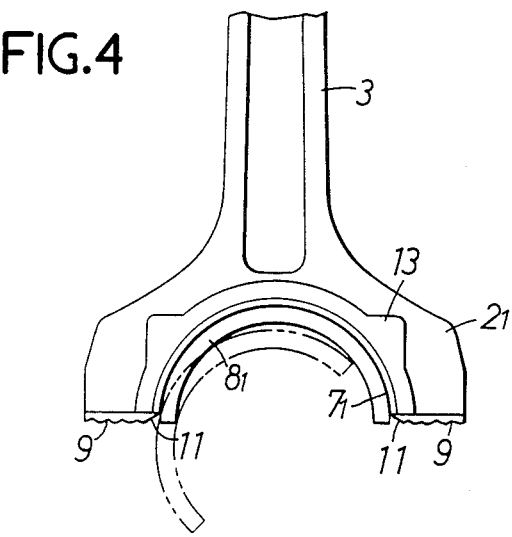
FIG.4
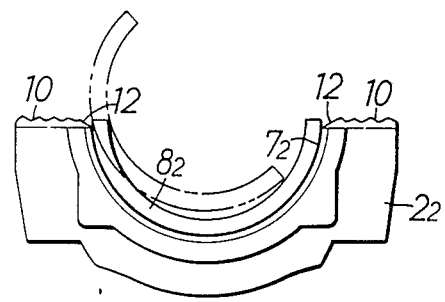

4,802,269

METHOD FOR PRODUCING CONNECTING ROD OF RECIPROCATING MOTION SYSTEM

This is a division of application Ser. No. 775,987, filed Sept. 13, 1985, now U.S. Pat. No. 4,693,139.

BACKGROUND OF THE INVENTION

1. Field of the Invention

The present invention relates to a connecting rod for use in reciprocating motion systems such as reciprocating internal combustion engines and a method for producing the same.

2. Description of the Prior Art

There are conventionally known such connecting rods for connecting a piston with a crankshaft in a reciprocating motion system, which include a larger diameter end portion broken and divided into a body side bearing half and a bearing cap, for example, as described in Japanese Patent Application Laid-open No. 37311/83.

In the production of such connecting rods, it is a conventional and common practice to make elongated notches or grooves only in the axially opposite end surfaces of the larger diameter end portion of the connecting rod product from the forging of a blank, at which notches or grooves the larger diameter end portion is ultimately intended to be broken and divided into sections, and then subjecting the notched or grooved part of the larger diameter end portion to a carburizing and quenching treatment for hardening. Thereafter, the resulting larger diameter end portion is broken and divided into a body side bearing half and a bearing cap, which parts are subsequently clamped together by connecting bolts, so that the bearing hole of the large diameter end portion can be finished. After such finishing, however, when split bearing metals are intended to be assembled to the respective semicircular bearing surfaces of the body side bearing half and the bearing cap, the reverses of the bearing metals may contact or bear the sharp inner edges of the broken and divided surfaces of the body side bearing half and the bearing cap and consequently, the reverses may be damaged or residual metal. In addition, the cut powder resulting from such cutting may remain on the broken and divided surfaces, where it may prevent the accurate re-assemblability of the parts of the larger diameter end portion.

THE SUMMARY OF THE INVENTION

It is therefore an object of the present invention to provide a connecting rod of a reciprocating motion system and a method for producing the same, which is simple in construction, and that overcomes the above problems.

According to the present invention, the above object is accomplished by providing a connecting rod of a reciprocating motion system in which the larger diameter end portion having a bearing hole made therein is broken and divided into a body side bearing half and a bearing cap, and a bearing metal is incorporated in the bearing hole, said bearing half and said bearing cap being connected together by connecting bolts, wherein the semicircular bearing surfaces of the body side bearing half and the bearing cap are chamferred along their broken and divided surfaces, respectively.

With such an arrangement, in assembling the bearing metal to the two split parts of the larger diameter end portion of the connecting rod, the bearing metals can not be damaged or cut.

Further, according to the present invention, the chamferring operation may be performed in the larger diameter end portion to produce elongated substantially V-shaped notches or grooves therein prior to breaking and dividing it into the body side bearing half and the bearing cap, and thereafter, conducting such breaking and dividing operation along the so-formed notches.

Therefore, the breaking and dividing can be extremely easily carried out, and regardless of the groove-forming step, the method for producing the connecting rod can be kept from being complicated.

BRIEF DESCRIPTION OF THE DRAWINGS

The above and other objects, features and advantages of the present invention will become apparent from reading of the following description taken in conjunction with the accompanying drawings in which:

FIGS. 1 to 4 illustrate a first embodiment of a connecting rod according to the present invention;

FIG. 1 is a front view thereof;

FIG. 2 is a sectional view taken along the line II—II in FIG. 1;

FIG. 3 is a view in cross section taken along the line III—III in FIG. 1;

FIG. 4 is a front view of a divided larger diameter end portion;

FIG. 5 is a fragmentary front view thereof; and

FIG. 6 is an enlarged view in part of FIG. 5.

DESCRIPTION OF THE PREFERRED EMBODIMENTS

Figure 2:
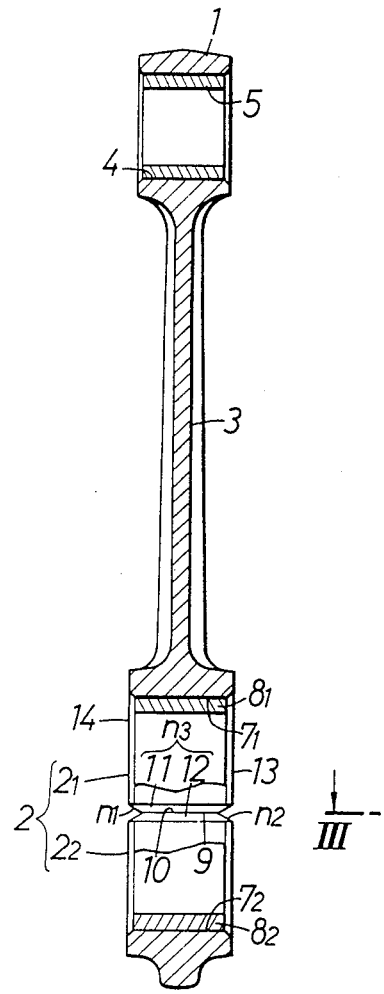
Figure 1:
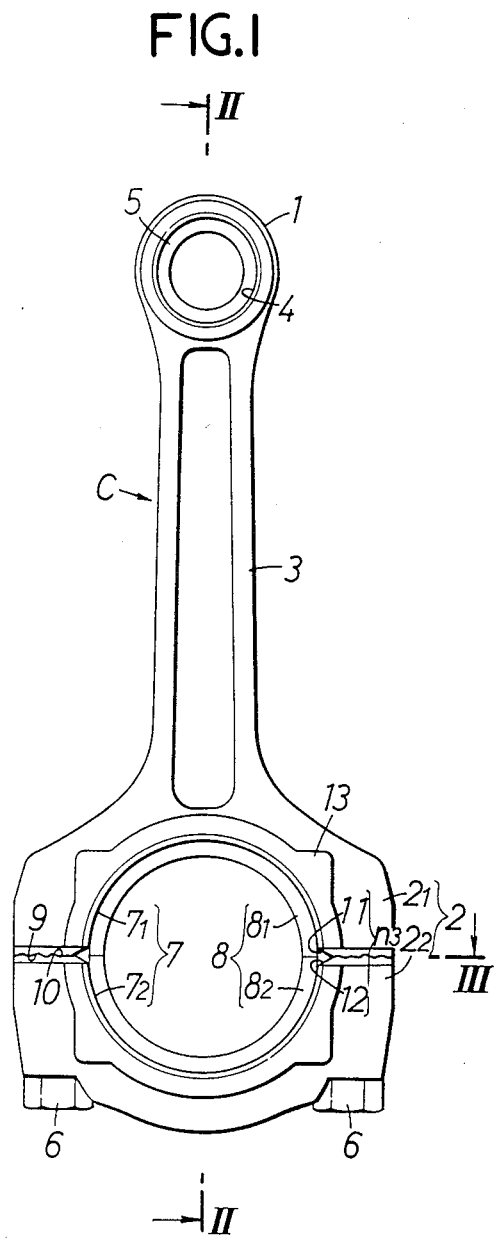

The present invention will now be described in more detail by way of preferred embodiments with reference to the accompanying drawings.

Referring to FIGS. 1 to 4 which illustrate a first embodiment, there is shown a connecting rod C comprising a smaller diameter end portion 1, a larger diameter end portion 2 and a straight rod portion 3 integrally connecting both the end portions 1 and 2. The smaller diameter end portion 1 has a pin hole 4 made therein. A bearing metal 5 is fitted in the pin hole 4, and has a piston pin of a piston (not shown) rotatably journaled therein. The larger diameter end portion 2 is broken and divided into a body side bearing half $2_1$ integral with the rod portion 3, and a bearing cap $2_2$, which are integrally connected to each other by two connecting bolts 6. The larger diameter end portion 2 has a bearing hole 7 formed therein, within which is fitted a bearing metal 8 consisting of a pair of split metals $8_1$ and $8_2$. The crankpin of a crankshaft (not shown) is rotatably connected to the bearing metal 8. On the respective semicircular bearing surfaces $7_1$ and $7_2$ of the body side bearing half $2_1$ and the bearing cap $2_2$ constituting the larger diameter end portion 2, there are provided chamfers 11 and 12 consisting of bevels or inclined surfaces extending along the broken and divided surfaces 9 and 10.

It is to be noted that in assembling the split metals $8_1$ and $8_2$, respectively, to the semicircular bearing surfaces $7_1$ and $7_2$ of the body side bearing half $2_1$ and the bearing cap $2_2$, the chamfers 11 and 12 play an important role. Specifically, they serve to ensure that even if the reverses or peripheral surfaces of the split metals $8_1$ and $8_2$ hit against the corners of the divided surfaces 9 and 10 when the split metals $8_1$ and $8_2$ are assembled to the body side bearing half $2_1$ and the bearing cap $2_2$, as shown in FIG. 4, the reverses are not damaged nor will residual metal powder consequently be generated.

The chamfers 11 and 12 can be made in the course of the production of the connecting rod C. More particularly, before breaking and dividing the larger diameter portion 2 into the body side bearing half $2_1$ and the bearing cap $2_2$, the connecting rod product resulting from the forging of a blank is processed by forming a plurality of elongated V-shaped notches or grooves identified as $n_1$, $n_2$ and $n_3$ in the respective surfaces of the formed blank. That is, the grooves $n_1$ and $n_2$ are formed in the axially opposite end surfaces 13 and 14 of the larger diameter end portion 2 and grooves $n_3$ are formed across each of the inner peripheral surfaces of the bearing hole 7. The grooves $n_1$, $n_2$ and $n_3$ occur the surfaces intended to be broken and divided. Thereafter, the larger diameter end portion 2 may be broken and divided along the notches $n_1$, $n_2$ and $n_3$ into the body side bearing half $2_1$ and the bearing cap $2_2$. In this case, since the V-shaped notches $n_1$, $n_2$ and $n_3$ are formed, as described above, in the three surfaces on opposite sides of the bearing hole 7 along which the intended breaking and dividing is to occur, the breaking and dividing operation is easy to effect.

Alternatively, either one of the notches $n_1$ and $n_2$ may be made in only one of the axially opposite end surfaces 13 or 14 of the larger end portion 2.

For the purpose of insuring the accuracy of the bearing hole 7, the body side bearing half $2_1$ and the bearing cap $2_2$ may be integrally clamped by the connecting bolts 6, and the bearing hole 7 may then be subjected to a finishing operation. Therafter, the larger diameter end portion 2 may be broken and to be divided into the body side bearing half $2_1$ and the bearing cap $2_2$. With breaking of the parts occurring along the notches $n_1$ and $n_2$ the chamfers 11 and 12 consisting of the bevels or inclined surfaces $n_3$ are thus provided transversely across the respective semicircular bearing surfaces $7_1$ and $7_2$ of the bearing half $2_1$ and the bearing cap $2_2$, respectively.

Figure 5:
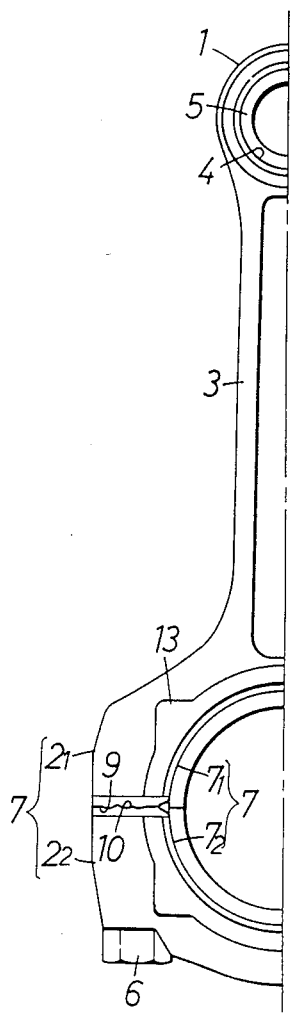
FIGS. 5 and 6 illustrate a second embodiment of a connecting rod according to the present invention.
Figure 6:
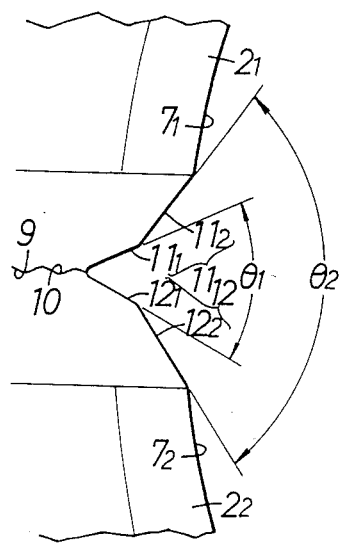

FIGS. 5 and 6 illustrate a second embodiment of the present invention. In this embodiment, chamfers 11 and 12, which are made in the broken and divided surfaces 9 and 10 of the semicircular bearing surfaces $7_1$ and $7_2$ of the body side bearing half $2_1$ and the bearing cap $2_2$, respectively, are formed by two stepped surfaces. In other words, the chamfer 11 (12) is comprised of a first gently inclined surface $11_1$ ($12_1$) and a second steeply inclined surface $11_2$ ($12_2$). The angle $\theta_1$ formed by the first inclined surfaces $11_1$ and $12_1$ is of 45° to 50°, preferably 50°, and the angle $\theta_2$ formed by the second inclined surfaces $11_2$ and $12_2$ is of 90° to 110°, preferably 110°.

In the second embodiment, the breaking and dividing can be attained in the region of the V-shaped groove defined by the first inclined surfaces $11_1$ and $12_1$. In addition, the region of the V-shaped groove defined by the second inclined surfaces $11_2$ and $12_2$ may not be affected by the breaking and dividing. Thus, the reverses of the split metals can be more effectively prevented from being damaged or from generating residual metal powder cuttings.

What is claimed is:

1. A method of producing a connecting rod of a reciprocating motion system wherein the connecting rod includes a larger diameter end portion having a bearing hole formed therein and a bearing metal incorporated into the bearing hole, said larger diameter end portion being divided into body side bearing half and a bearing cap that are connected together by bolts means, the method comprising:

subjecting a blank to a forging operation to produce an intermediate connecting rod product having an enlarged diameter end portion containing opposite end surfaces and a hole axially therethrough;

providing continuous grooves of a generally V-shaped section on the opposite end surfaces of said product and transversely through said hole, said transversely extending grooves being formed as continuations of said end surface grooves;

at least said transversely extending grooves having oppositely facing, inclined surfaces including a first, gently inclined portion and a second, steeply inclined portion; and dividing said larger diameter end portion into said bearing half and said bearing cap along said generally V-shaped grooves.

2. The method according to claim 1 wherein said grooves are formed on opposite end surfaces of said larger diameter end portion and at diametrically spaced locations on the surface of said bearing hole.

3. The method according to claim 2 wherein the apices of each of said bearing hole surface grooves are continuous with those of the grooves on the respective end surfaces.

4. The method according to claim 1, wherein said dividing step is effected within a region of the first portion of the oppositely facing surfaces of said transversely extending grooves.

* * * * *

UNITED STATES PATENT AND TRADEMARK OFFICE
CERTIFICATE OF CORRECTION

PATENT NO. : 4,802,269

DATED : February 7, 1989

INVENTOR(S) : MASATO MUKAI et al.

It is certified that error appears in the above-identified patent and that said Letters Patent is hereby corrected as shown below:

In column 4, line 13, delete "of" (first occurrence) and insert therefor -- for --.

In column 4, line 19, delete "bolts" and insert therefor -- bolt --.

Signed and Sealed this

Twenty-first Day of November, 1989

Attest:

JEFFREY M. SAMUELS

Attesting Officer     Acting Commissioner of Patents and Trademarks